July 26, 1932.  S. M. LUCAS  1,869,017

ELECTRICAL RECTIFIER

Filed May 4, 1928    2 Sheets-Sheet 1

INVENTOR:
S. M. Lucas,
by A. L. Vencill,
His attorney

Patented July 26, 1932

1,869,017

UNITED STATES PATENT OFFICE

SAMUEL M. LUCAS, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL RECTIFIER

Application filed May 4, 1928. Serial No. 275,200.

My invention relates to electrical rectifiers, and particularly to rectifiers of the type comprising an asymmetric unit made up of a metal disk having at least a portion of its surface covered with a coating of a compound of the metal.

I will describe several forms of rectifiers embodying my invention, and will then point out the novel features thereof in claims.

Figure 1:
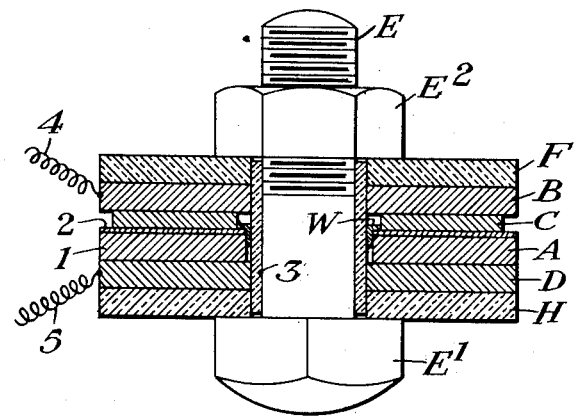
Figure 2:
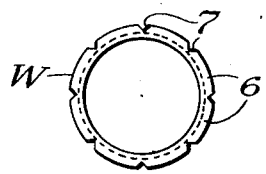

In the accompanying drawings, Fig. 1 is a vertical longitudinal sectional view showing one form of rectifier embodying my invention. Fig. 2 is a detail view showing a portion of the rectifier illustrated in Fig. 1 and also embodying my invention. Figs. 3 to 10 inclusive are detailed sectional views showing several modifications of a portion of the rectifier illustrated in Fig. 1 and also embodying my invention.

Similar reference characters refer to similar parts in each of the several views.

Referring first to Fig. 1, the rectifier comprises an asymmetric unit A made up of a metallic disk 1 having one surface provided with a coating 2 of a compound of the metal. For example, the disk 1 may be of copper and the coating 2 may be of cuprous oxide, or the disk 1 may be iron, and the coating 2 may be ferrous oxide. Asymmetric units of the type described exhibit the characteristic of offering a lower resistance to currents tending to flow from the compound to the metal than to currents tending to flow in the opposite direction.

In order to provide electrical connections between the asymmetric unit A and an external circuit, I propose to clamp the unit between two rigid conducting contact plates B and D. The plates are clamped together between the head $E^1$ of a bolt E and a nut $E^2$ threaded on the shank of the bolt. The shank of the bolt E passes through holes in the asymmetric unit A and the contact plates B and D but is insulated from these parts by a sleeve 3 surrounding the bolt. An insulating member F is placed between the nut $E^2$ and the contact plate B, and a similar insulating member H is placed between the head $E^1$ of the bolt and the contact plate D. Connections to an external circuit may conveniently be made by wires 4 and 5 connected with contact plates B and D, respectively.

The electrical connection between the contact plate B and the coating 2 of the asymmetric unit A may be improved by inserting between the plate and the unit a sheet C of malleable conducting material such for example, as lead. In assembling a rectifier of the type described, it sometimes happens, however, that the lead sheet C is bent over the edge of the adjacent coating 2 of the asymmetric unit A. If the rectifier is assembled with the lead sheet in this position, and if the nut $E^2$ is then drawn up on the bolt E, it may happen that the edge of the lead sheet C is crowded over the edge of the coating 2 and into contact with the metal disk 1. Should this occur, it will be plain that the asymmetric unit would be short-circuited and it would therefore fail to operate in the manner intended. In order to prevent this undesirable occurrence, I provide the rectifier with means for holding the lead sheet C in concentric relation to the asymmetric unit A. With the form of rectifier shown in Fig. 1, this is accomplished by means of a flanged sleeve W which is made of insulating material and inserted between the asymmetric unit A and the sleeve 3 which surrounds the bolt E. The flange of the sleeve W lies flat against the coating 2 of the asymmetric unit A and engages the inner edge of the lead sheet C to hold this sheet in a position concentric with the unit A.

Referring now also to Fig. 2, the flange of the sleeve W may be provided at its periphery with a plurality of spaced radially extending slits 7 which divide the flange into a plurality of leaves 6, the corners of which may be bent slightly out of the plane of the flange to insure that the lead sheet C will not be crowded past the edge of the flange.

Figure 3:
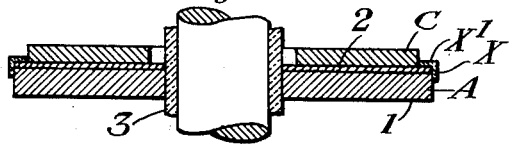

In the form shown in Fig. 3, the lead sheet C is held in concentric relation to the unit A by means of a band X of insulating material. The band X fits around the edge of the unit A and is provided with an integral flange $X^1$ which rests on the flat surface of the coating 2. The flange $X^1$ engages the outside edge of the lead sheet C and holds the sheet C in a centrally located position with respect to the unit A. When either the flanged sleeve shown in Fig. 2 or the flanged band shown in Fig. 3 is used to center the lead sheet C, the sheet C will have an outside diameter somewhat smaller than the unit A and an inside diameter somewhat larger than the unit A.

Figure 4:
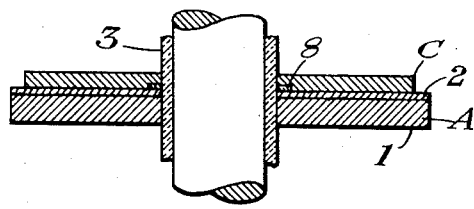

In the modification shown in Fig. 4, the lead sheet C is provided with a flat ring 8 of insulating material on the side adjacent the coating 2 of the unit A. This ring 8 encircles rather closely the insulating sleeve 3 and holds the lead sheet C in concentric relation with respect to the unit A. The ring 8 may be secured to the lead sheet by an adhesive, or it may be made of a material sufficiently rough to adhere to the lead. With this construction, should the inside edge of the lead sheet C, with the accompanying ring 8, become pinched between the sleeve 3 and the metal disk, the insulating ring 8 would prevent contact between the sheet and the disk 1. Furthermore, should the inside edge of the coating 2 be defective, or should the coating incompletely cover the surface of the disk 1, the insulating ring 8 would prevent contact between the sheet C and the disk 1.

Figure 5:
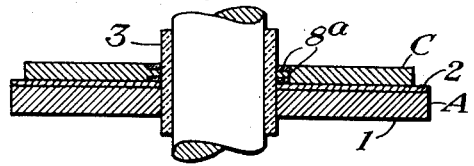

Referring now to Fig. 5, the lead sheet C is provided with two flat insulating rings 8ª encircling the sleeve 3, one located on each side of the sheet C. These rings may be secured to the lead sheet C in the same manner as the ring 8 described in connection with Fig. 4. In the modification shown in Fig. 5, both rings aid in preventing the possibility of the inside edge of the lead sheet from being pinched between the sleeve 3 and the metal disk 1 to make contact between the lead sheet and the metal disk.

Figure 6:
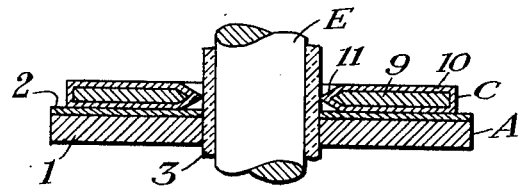

In the modification shown in Fig. 6, the sheet C is made up of a metallic core 9 such for example as copper, which is entirely covered with a layer 10 of malleable material such for example as lead. The layer 10 may be conveniently placed upon the core 9 by electro-deposition. As shown in the drawings, the inner edges of the sheet C are bevelled at 11, so that the sheet engages with the sleeve 3 to accurately position the sheet. Due to the bevelled edges of the sheet, however, the sheet does not engage the unit A adjacent the inner edges of the unit and it is therefore impossible for the unit to become short circuited.

Figure 7:
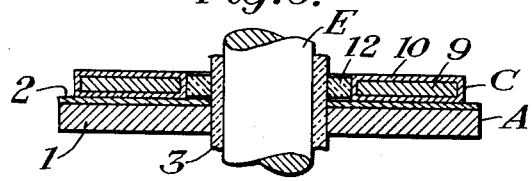

In the form shown in Fig. 7, the sheet C comprises a metallic core 9 with a layer 10 of lead similar to the sheet shown in Fig. 6, but in Fig. 7, sheet C is provided with a bushing 12 of insulating material which fits around the sleeve 3. The bushing 12 is attached firmly to the sheet C and serves to hold the sheet in concentric relation with the sleeve 3 and hence with the unit A.

Figure 8:
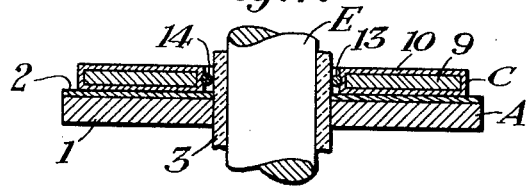

Referring now to Fig. 8, the sheet C, which is constructed as described hereinbefore in connection with Figs. 6 and 7, is provided with an annular groove 14 in which is placed a resilient ring 13 which may for example be of spring wire. The ring 13 engages the sleeve 3 and holds the sheet C in concentric relation to the unit A, while preventing the possibility of short circuiting the unit A.

Figure 9:
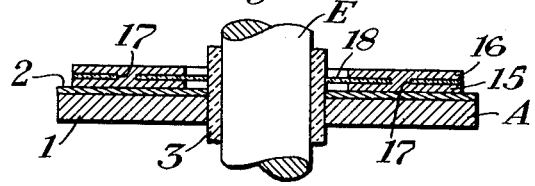

In the modification shown in Fig. 9, a washer 18 of insulating material is provided on opposite surfaces with two sheets of lead 15 and 16. As shown in the drawings, the washer 18 is provided with a plurality of holes 17 and I prefer to subject the sheets 15 and 16 and the washer 18 to considerable pressure before assembling the rectifier so that the lead of sheets 15 and 16 flows into the holes 17, thereby securely attaching the sheets to the washer and providing electrical contact between the sheets. It will be seen that the hole in washer 18 for receiving the sleeve surrounding the bolt E is so proportioned that the washer fits snugly against the sleeve to hold the parts in their proper concentric positions.

Figure 10:
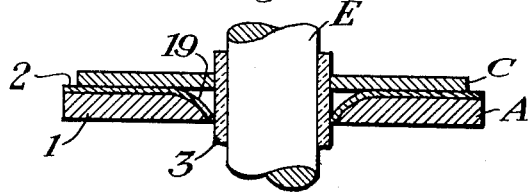

Short circuiting of the rectifier may also be avoided by constructing the parts as shown in Fig. 10. In this view, the asymmetric unit A has its inner edges bevelled at 19, that is to say, the hole for receiving the sleeve 3 is tapered, the larger end of the hole being adjacent the side of the unit A which is provided with the coating 2 of oxide. With this arrangement, a plain flat sheet C of lead or lead foil may be clamped against the unit A to ensure good electrical connection, the tapered hole making it impossible for the sheet C to short circuit the unit.

Although I have herein shown and described only a few forms of electrical rectifiers embodying my invention, it is understood that various changes and modifications may be made therein within the scope of the appended claims without departing from the spirit and scope of my invention.

Having thus described my invention, what I claim is:

1. A rectifier comprising a flat asymmetric unit made up of a metallic disk having one side provided with a coating of a compound of the metal, a lead sheet, means for clamping said sheet against said coating, and means for preventing said sheet from engaging said disk.

2. A rectifier comprising a flat circular asymmetric unit, a circular lead sheet lying adjacent one side of the unit, a bolt extending through the lead sheet and the unit and provided on its shank with an insulating sleeve, a flat circular ring of insulating material encircling said sleeve and attached to the lead sheet on the side adjacent the unit, and a nut threaded on the bolt for clamping the sheet and the unit together.

3. A rectifier comprising an asymmetric unit, a circular lead sheet having a centrally located hole therein, two flat circular rings of insulating material attached to opposite sides of the lead sheet and encircling the hole in said sheet, a bolt extending through the unit and the sheet and electrically insulated therefrom, and a nut threaded on the bolt for clamping said sheet and said unit together.

4. A rectifier comprising a flat circular asymmetric unit made up of a metallic disk having one side provided with a coating of a compound of the metal, a circular lead sheet adjacent the coating of the unit, a bolt extending through the lead sheet and the unit and provided on its shank with an insulating sleeve, a flat circular ring of insulating material encircling said sleeve and attached to the lead sheet on the side adjacent the coating, and a nut threaded on the bolt for clamping said sheet and said unit together.

5. A rectifier comprising an asymmetric unit made up of an apertured metallic disk having one side provided with a coating of a compound of the metal, an apertured sheet of impressionable metal located in contact with said coating, and a bolt extending through the apertures in said disk and sheet and insulated therefrom, said sheet being provided with an annular recess extending inwardly from the aperture on the side adjacent to the coating on the metal disk to prevent the sheet from short-circuiting the asymmetric unit.

6. A rectifier unit including oxide coated plates, insulating means arranged to maintain said plates in alignment, current-collecting disks arranged between pairs of said plates and provided with fins arranged to extend between said disks and said insulating means and out of contact with said oxide coatings.

7. A rectifying unit including oxide coated plates, insulating means arranged to maintain said plates in alignment, current-collecting disks arranged between pairs of said plates and spaced from the edges of said oxide coatings by fins extending between said disks and said insulating means.

8. A rectifier including a plurality of asymmetric conductors, an insulating sleeve arranged to maintain said conductors in alignment, and current-collecting members provided with fins arranged to extend between said members and said insulating sleeve for maintaining said members in alignment and out of contact with an edge of said conductors.

9. A rectifying unit including oxide coated plates, an insulation support arranged to maintain the edges of said plates in alignment with one another, and current-collecting members interposed between said plates adjacent said coating and provided with a comparatively thin portion adjacent said support.

10. A rectifying unit including oxide coated plates, an insulation support arranged to maintain the edges of said plates in alignment with one another, and current-collecting members interposed between said plates adjacent said coating and provided with a relatively thin portion extending from the edges of said members into contact with said support.

11. A rectifying unit including oxide coated disks provided with openings, an insulating support arranged to extend through said openings and to maintain the edges of said disks in alignment with one another, and current-collecting washers adjacent said coating having a smaller external diameter than said disks and provided adjacent said support with a relatively thin portion.

12. A rectifier comprising a flat asymmetric unit provided with a hole, an insulating sleeve fitting snugly in said hole, and a flat metallic sheet adjacent one surface of said unit and provided with a hole to receive said sleeve, said sheet having its inner edges bevelled to prevent contact between the sheet and the unit adjacent said sleeve.

In testimony whereof I affix my signature.

SAMUEL M. LUCAS.